OR 3,801,180

United States
MaGuire et al.

[11] 3,801,180
[45] Apr. 2, 1974

[54] OPTICAL DEFLECTION SYSTEMS
[75] Inventors: Gerald John MaGuire, Stevenage; Gordon George Scarrott, Welwyn Garden City, both of England
[73] Assignee: International Computer Limited, London, England
[22] Filed: June 15, 1972
[21] Appl. No.: 263,161

[30] Foreign Application Priority Data
July 1, 1971    Great Britain.................... 30850/71

[52] U.S. Cl........................ 350/7, 178/7.6, 350/294, 350/190
[51] Int. Cl. ............................................ G02b 17/00
[58] Field of Search ........... 350/6, 7, 285, 293, 294, 350/295, 288, 299, 190; 178/7.6

[56]    References Cited
UNITED STATES PATENTS
3,501,222    3/1970    Herriott............................ 350/294
3,382,367    5/1968    Hardy................................ 350/294

Primary Examiner—Ronald L. Wibert
Assistant Examiner—Michael J. Tokar
Attorney, Agent, or Firm—Hane, Baxley & Spiecens

[57]    ABSTRACT

An optical deflection system for deflecting a light beam for the purpose of scanning a computer store or matrix location, the apparatus including means for producing at a first mirror a line image which is reflected to a second mirror so that the line image at the second mirror is at right angles to the image on the first mirror and means for rotating the second mirror about an axis parallel to said line image at the first mirror thereby to deflect the line image reflected from the second mirror.

8 Claims, 2 Drawing Figures

OPTICAL DEFLECTION SYSTEMS

BACKGROUND OF THE INVENTION

1. FIELD OF THE INVENTION

The present invention relates to optical deflection system.

2. DESCRIPTION OF THE PRIOR ART

In the field of optical storage devices, it is common to access a particular storage location, in say a matrix of each locations, by directing a beam of light upon the desired location. Thus, while means must be provided to move a light beam over all elements of a matrix, certain problems have arisen with known techniques. Previously, it has been found that mechanical optical scanning techniques will provide high angular resolution and high angular swings but have rather low scanning speeds, this latter factor acting to prevent fast access times for optical stores. Also, while higher scanning speeds can be achieved by employing electrically controlled birefringence techniques, both angular resolution and angular swing remain low.

With mechanical optical deflecting techniques, the disadvantage of slow scanning speed generally results from the fact that various optical elements, mirrors, prisms, etc, have a certain inertia which must be overcome in order to move the optical element and deflect an input beam. Attempts to solve this problem, however, have resulted in systems in which the positions of an input beam on say, a plurality of reflecting mirrors is changed by varying the position upon which the input beam is incident upon the initial mirror of the system. Such a system is shown in U.K. Patent Specification 1,087,060 in which a transparency having clear and opaque portions determines the deflection of an input beam by a set of reflecting mirrors. Various detecting means are provided for producing output signals in accordance with the pattern of clear/opaque portions of the transparency.

SUMMARIES OF THE INVENTION

According to the present invention, apparatus for deflecting an input beam of light includes a first mirror, means for producing a line image from said input beam on said first mirror, a second mirror positioned to receive a reflection of said line image from said first mirror, the line image reflection onto said second mirror being normal to said line image on said first mirror; and means for rotating said second mirror about an axis parallel to said line image on said first mirror thereby to deflect the line image reflected from said second mirror.

According to a further aspect of the present invention, an apparatus for deflecting an input beam of light includes a first set of spherical mirrors having equal radii of curvature and centres of curvature lying along a first line, a second set of cylindrical mirrors having equal radii of curvature and centres of curvature lying along a second line spaced from the first line; means to produce a line image from the input beam on one of said first mirrors, the line image being reflected alternately between mirrors of said first and second sets in such manner that the line image on any one mirror is normal to the line image reflected from an immediately previous mirror and or succeeding mirror, and means for rotating said second mirrors about a line parallel to the line images on said first set of mirrors in such manner as to deflect said line images from said second mirrors.

According to a further aspect of the present invention, a method of deflecting an input beam of light includes the steps of producing a line image on a first mirror from said input beam, positioning a second mirror to receive a reflection from said first mirror, the line image reflected onto said second mirror being normal to said line image on said first mirror, and rotating said second mirror about an axis parallel to said line image on said first mirror to deflect the line image reflected from the second mirror.

BRIEF DESCRIPTION OF THE DRAWING

For a better understanding of the invention and to show how to carry the same into effect reference will now be made to the accompanying drawings, in which.

DESCRIPTION OF THE PREFERRED EMBODIMENT

Figure 1:
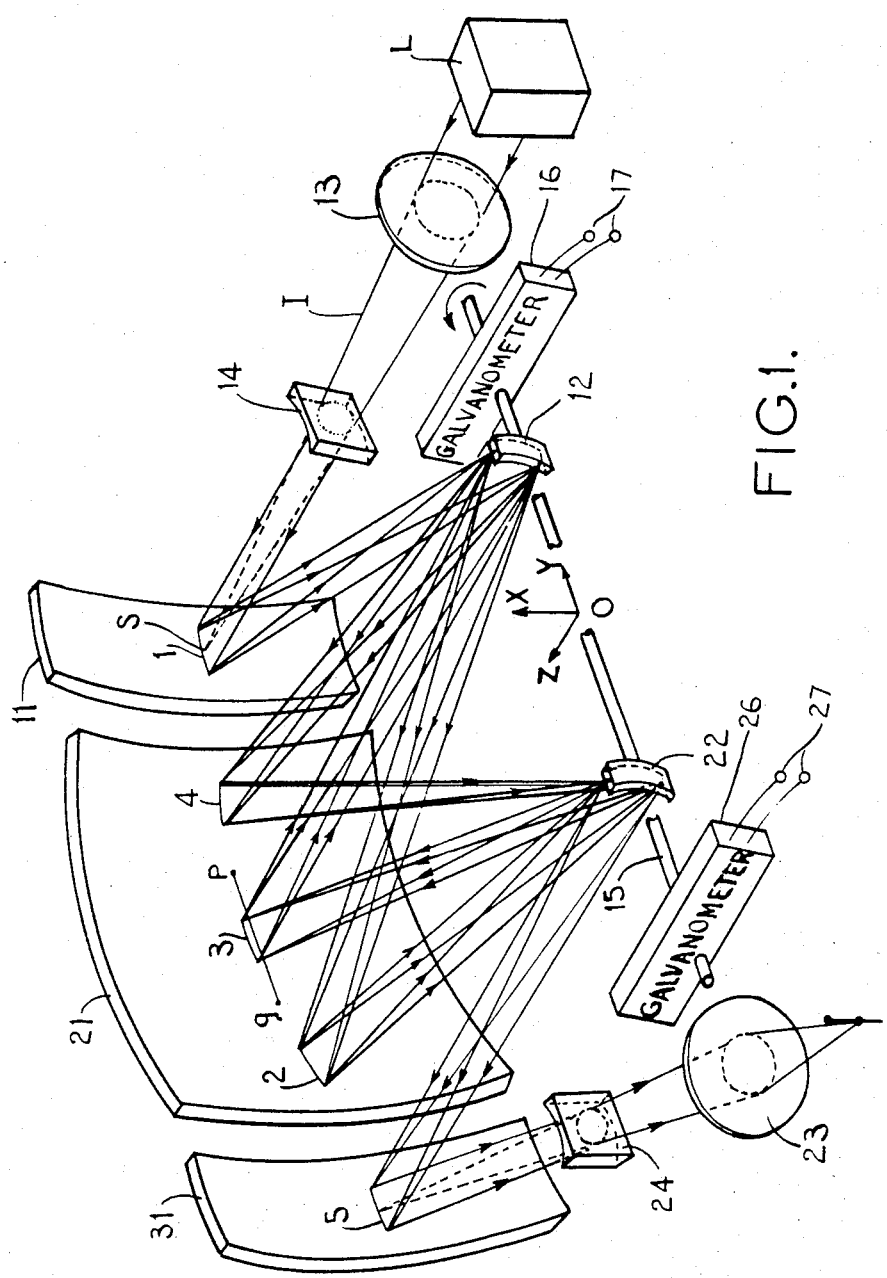
FIG. 1 shows as a diagrammatic representation of a beam deflecting apparatus, the figure illustrating an operational position in which an input beam is in an undeflected position, and, FIG. 2 shows the apparatus of FIG. 1 with the input beam in a deflected position.

Referring now to FIG. 1, there is shown a set of fixed spherical mirrors 11, 21 and 31 which have equal radii of curvature and centres at points, $a$, $o$ and $b$, respectively lying on an axis Y. Two cylindrical mirrors 12 and 22 are mounted for independent rotation on an axle 15 and have equal radii of curvature with centres of curvature p and q lying on the mirror 21. A positive spherical lens 13 and a negative cylindrical lens 14 are positioned to pass an input beam of light from a source L to the mirror 11. The lens 13, has its focal plane at S on the mirror 11. A negative cylindrical lens 24 and a positive spherical lens 23 are positioned to receive the beam reflected from the mirror 31. The lens 23, has its focal plane at the surface of the mirror 31. The axle 15 is mounted for rotation about the Y axis. A galvanometer 16 having input terminals 17 is arranged to rotate the mirror 12 about the axle 15 when energised by an input signal applied to the terminals 17. The rotation of the mirror 12 is independent of the rotation of mirror 22 about the axle 15. A galvanometer 26 with input terminals 27 is able to rotate the mirror 22 relative to axle 15 independently of the mirror 12. The galvanometer 26 is energised by input signals applied to the terminals 27.

Figure 2:
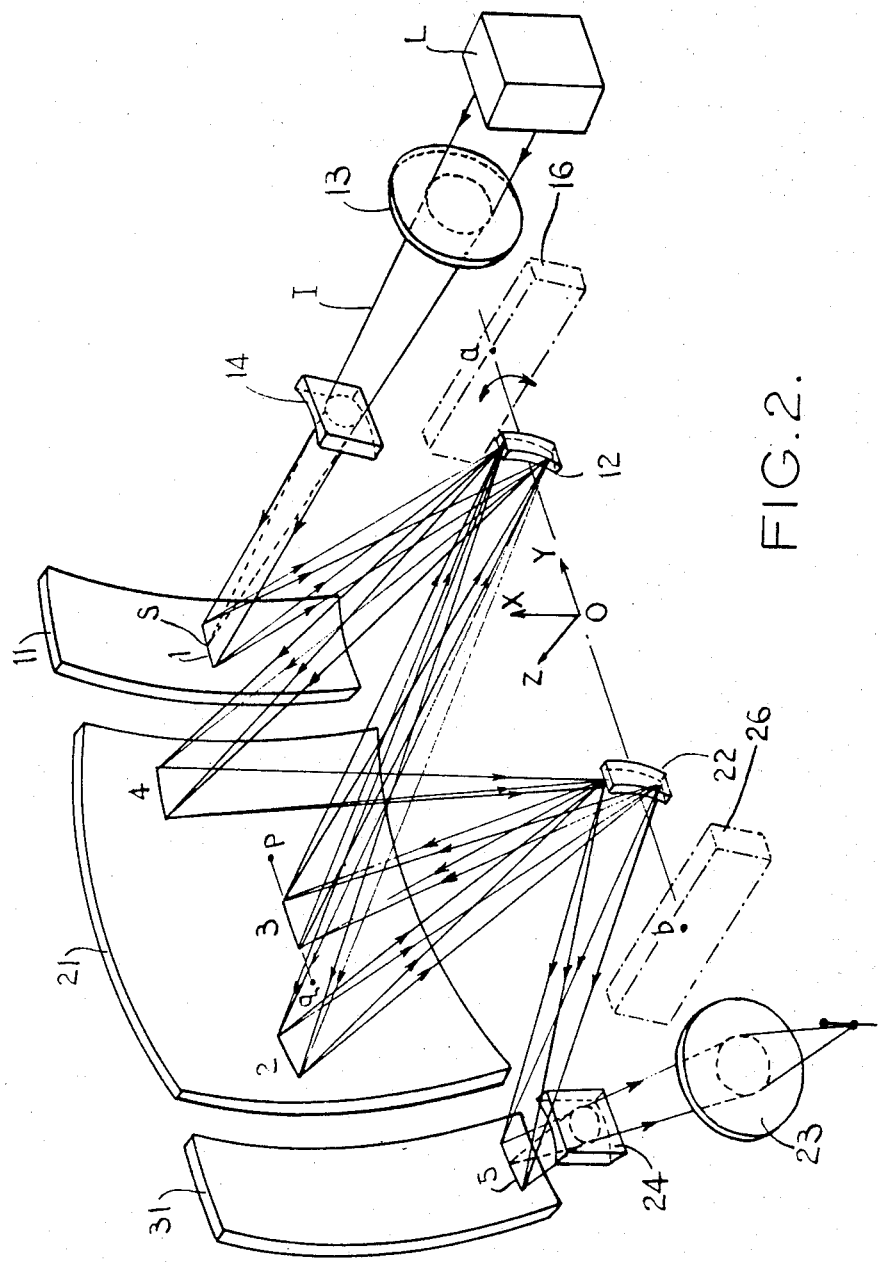

In operation, the apparatus for deflecting an input beam may be considered when the apparatus does not subject the beam to deflection i.e. the undeflected condition (FIG. 1) and when the beam has been deflected i.e. the deflected condition (FIG. 2). In the case of the undeflected condition, an input beam of light is passed through the lens 13 to the cylindrical lens 14 which produces a line image 1 parallel to the Y axis at the mirror 11. The beam 1 is reflected from the mirror 11 to the cylindrical mirror 12. The image at the mirror 12 oriented in a direction along the X axis. The beam 1 is then reflected onto the mirror 21 as a line image 2 parallel to the Y axis. The beam 1 is then reflected from the mirror 21 onto the mirror 22 to form at the mirror 22 a line image directed along the X axis. The mirror 22 reflects the beam back to the mirror 21 as line image 3 directed along the Y axis. The line image 3 is reflected from the mirror 21 to the mirror 12 and forms at the mirror 12 a line image extending along the X axis. This latter line image is reflected from the mirror 12 onto mirror 21 as a line image 4. The line image 4 is reflected to the mirror 22 as a line image extending in the X direction. The image at the mirror 22 is then reflected to the mirror 31 and appears thereon as a line image 5 extending along the Y axis. Finally, the line image 5 is reflected from mirror 31 to the lens 24 which is a minifying copying lens having a magnification of less than unity and having its object distance equal to the radius of curvature of the mirror 31. The beam is then focussed by the lens 23 and appears as an output beam of light therefrom.

In order to deflect the input light beam 1, an input signal is applied to the terminals 17 of the galvanometer 16 which in turn causes a slight anti-clockwise rotation of the cylindrical mirror 12 while a similar signal is applied to the terminal 27 of the galvanometer 26 to cause a slight clockwise rotation of the mirror 22.

The line image 1 at the mirror 11 will remain in the same position, whereas the position of line the images 2, 3 and 4 at mirror 21 and the line image 5 at the mirror 31 will be altered as shown in FIG. 2. This will result in a corresponding change of the direction of the output beam from the lens 23. In this manner, the positioning of the output beam will be controlled by the deflection of the input beam. While an anti-clockwise rotation of mirror 12 and clockwise rotation of mirror 22 has been described, it will be clear that a similar result will be achieved by reversing the respective rotations of the mirrors 12 and 22.

By reflecting a plurality of line images produced from an input beam, it has been found that the tolerances of the multiple reflecting mirror arrangement are increased. If, for example, a line image is reflected onto a portion of a mirror that is partially obscured by say a dust particle or other unwanted material on the mirror surface, the greater portion of the line image is likely to be reflected from the mirror. However, if an input beam is reflected in the form of a point of light, for example, a small obscured area or point on a mirror surface may well prevent a substantial portion of the input beam from being reflected. In this latter case, difficulties will arise in attempting to detect the output beam from the lens 23.

A further and more important advantage of the present arrangement lies in the feature of the invention in which a line image on any one mirror is normal to the line image appearing on immediately preceding and succeeding mirrors. As seen in FIG. 1, the line images 1 to 5 at the mirrors 11, 21 and 31 lie along the X axis, while the line images on the mirrors 12 and 22 lie along the Y axis. In practice it is difficult to provide small rotatable mirrors 12 and 22 which only rotate about one (Y) axis. Inevitably, some unintended rotation about another (X) axis will occur. However by producing line images on the mirrors 12 and 22 along the X axis, any unintended rotation of mirrors 12 and 22 about the X axis will have no effect on the deflected beam from the mirrors 12 and 22. In this manner then, unintended deflections are substantially eliminated.

The small cylindrical mirrors 12 and 22 are positioned as close as possible to one another along the Y axis to reduce off-axis aberrations from the spherical mirrors 11, 21 and 31. While the arrangement shown in FIGS. 1 and 2 has been expanded along the Y axis for the sake of clarity, mirrors 12 and 22 may be positioned so that the centres thereof are separated by 3 cm or less. Also, the cylindrical mirrors 12 and 22 may be replaced by spherical mirrors having a length substantially greater than the width so as to act essentially as cylindrical mirrors. However, any suitably formed cylindrical mirror having the requisite optical properties of low spherical aberration, high optical flatness etc, will suffice. Spherical mirrors 11, 21 and 31 may be aluminum coated mirrors of an optical quality such that spherical aberrations are less than one quarter wavelength of the input beam. This requirement for mirror quality is important to assure that all points of a reflected image reach the focal point of a particular mirror at the same time.

While an arrangement of positive spherical lenses 14 and 24 and negative cylindrical lens 13 and 23 has been described as a way of prodicing a line image from an input beam and for producing an output beam from a line image, other suitable optical arrangements may be employed. Also, although a galvanometer 16 has been disclosed as a means of providing a rotation of mirrors 12 and 22, other suitable mechanical or electromechanical means may be employed. For example, separate coils may be positioned around each of cylindrical mirrors 12 and 22.

The input beam may be a laser beam or may be produced by a conventional light source. In the latter case, however, the beam must be carefully produced as a highly concentrated light beam is required. While the multiple reflecting technique of the present invention is applicable to an optical mass store, the technique may be employed whenever rapid deflection of a light beam is required.

Finally, while FIGS. 1 and 2 show an arrangement comprised of three fixed spherical mirrors 11, 21 and 31 and two rotatable cylindrical mirrors 12 and 22, it will be be appreciated that as many mirrors may be employed as necessary to achieve a particular angular swing. The overall angular deflection (U) of the input beam may be determined from the following expression:

$$U = 2 N u$$

Where
 $u$ = the angle of rotation of anyone of the rotatable mirrors 12 or 22, etc, and
 $N$ = the total number of reflections on the rotatable mirrors, 12 and 22, etc.

In the present invention it has been found possible to achieve high angular resolution as well as high access speeds by deflecting an input beam with an arrangement of multiple reflecting mirrors. The arrangement is comprised of a first set of fixed spherical mirrors and a second set of smaller, rotatable mirrors. An input beam, which is formed as a line image, is then deflected by controlling the rotation of the second set of mirrors. As a result of the mirrors of the second set having low inertia, input beams can be deflected rapidly, which in turn allows an optical mass store, for example, to be accessed at high speeds.

We claim:
1. Apparatus for deflecting an input beam of light, comprising a mirror having a concave reflective surface defined by a surface of revolution about an axis; optical focusing means for causing the input beam to converge to a line image perpendicular to and intersecting said axis; a further mirror positioned at said line image and mounted for rotation about said axis, said further mirror being curved in a plane through said line image so as to reflect the light from said line image to a further line image on the surface of the first-mentioned mirror and lying parallel to said axis; further optical focusing means for causing the light reflected from said further line image to converge to a point image; and means for rotating said further mirror about said axis so as to deflect said further line image and hence deflect said point image.

2. Apparatus according to claim 1, wherein said means for rotating said further mirror is an electro-mechanical means responsive to an input electrical signal and adapted to rotate said further mirror through an angle dependent upon the magnitude of said electrical signal.

3. Apparatus according to claim 1, wherein said further optical focusing means comprises a negative cylindrical lens positioned with its cylindrical axis perpendicular to the axis of said surface of revolution, and a positive spherical lens.

4. Apparatus for feflecting an input beam of light, comprising a first set of concave spherical mirrors having equal radii of curvature and centres of curvature lying along a common axis; a second set of concave, substantially cylindrical mirrors mounted for rotation about said axis and having equal radii of curvature; means for focusing said input beam to a line image perpendicular to said axis, lying on one of said first mirrors, the beam then being reflected alternately between the mirrors of said first and second sets to form a series of line images on said mirrors, each of which image is normal to the immediately preceding or succeeding one in the series, the last of said images in the series lying on one of said first set of mirrors; means for focusing light from the last of said images to a point image; and means for rotating said second set of mirrors about said axis so as to deflect said images on said first set of mirrors and hence deflect said point image.

5. Apparatus according to claim 4 wherein said means for rotating said second set of mirrors comprises a plurality of electro-mechanical means, each of which is responsive to an input electrical signal and is adapted to rotate an associated one of said second set of mirrors through an angle dependent upon the magnitude of said electrical signal applied thereto.

6. Apparatus for deflecting an input beam of light, comprising a concave spherical mirror; two further mirrors positioned at respective conjugate foci of said concave spherical mirror and mounted for rotation about a common axis which intersects the centre of curvature of said concave spherical mirrors; optical focusing means for causing the input beam to converge to a line image, perpendicular to said axis, on one of said two further mirrors, the beam thus being reflected alternately between said two further mirrors by way of said spherical mirror a plurality of times before energing as an output beam of light; further optical focusing means for focusing said output beam to a point image; and means for rotating said two further mirrors about said axis thereby to deflect said point image.

7. Apparatus according to claim 6 wherein said further optical focusing means comprises a further concave spherical mirror positioned with its centre of curvature on said axis, to reflect said output beam, and a negative cylindrical lens and a positive spherical lens positioned in the path of the output beam after reflection from said further spherical mirror.

8. Apparatus according to claim 6 wherein said means for rotating said two further mirrors comprises two rotating devices for respectively rotating said two further mirrors in opposite senses about said axis.

* * * * *